United States Patent [19]

Ammann

[11] 3,749,945

[45] July 31, 1973

[54] CONSTANT CURRENT PULL-UP CIRCUIT FOR A MOS MEMORY DRIVER

[75] Inventor: Robert W. Ammann, Lisle, Ill.

[73] Assignee: GTE Automatic Electric Laboratories Incorporated, Northlake, Ill.

[22] Filed: Dec. 15, 1971

[21] Appl. No.: 208,090

[52] U.S. Cl. .................. 307/253, 307/268, 307/300

[51] Int. Cl. .................. H03k 5/00

[58] Field of Search .................. 307/253, 255, 263, 307/268, 300

[56] References Cited

UNITED STATES PATENTS

| | | | |
|---|---|---|---|
| 2,966,597 | 12/1960 | Bonn et al. | 307/268 X |
| 3,201,600 | 8/1965 | Cosby | 307/237 X |
| 3,157,797 | 11/1964 | Eshelman | 307/255 X |
| 3,194,979 | 7/1965 | Toy | 307/263 X |
| 3,215,858 | 11/1965 | Harding et al. | 307/237 |
| 3,470,391 | 9/1969 | Granger | 307/268 X |
| 3,121,807 | 2/1964 | Stephens, Jr. | 307/263 X |
| 3,215,855 | 11/1965 | Cole et al. | 307/263 X |

FOREIGN PATENTS OR APPLICATIONS

| | | | |
|---|---|---|---|
| 881,182 | 11/1961 | Great Britain | 307/300 |

OTHER PUBLICATIONS

"Rapid Turnoff Switch" by Gladstein, IBM Tech. Disclosure Bulletin, Vol. 9, No. 8, Jan. 1967, pages 1044–1045.

*Primary Examiner*—Stanley D. Miller, Jr.

*Attorney*—K. Mullerheim, R. F. Van Epps et al.

[57] ABSTRACT

An improved driver circuit for MOS (metal oxide semiconductor) memory device including means such as constant current switch means selectively activated to supply a constant current to the MOS input during pull-up so as to decrease the pull-up current rise time.

8 Claims, 4 Drawing Figures

INVENTOR
ROBERT W. AMMANN
BY
ATTORNEY

CONSTANT CURRENT PULL-UP CIRCUIT FOR A MOS MEMORY DRIVER

This invention relates to drive circuits and in particular to drive circuits for integrated circuit MOS memory units.

The input interface coupling an integrated circuit MOS memory device with various logic circuits typically requires special drive circuits to perform two functions. One of these functions consists of amplifying the output level of the logic pulse, such as from TTL gates, to the higher voltage required for driving purposes at the MOS memory input. The other function of the driver interface circuit is to provide a driver output capable of sourcing and sinking high currents so that voltage transition times at the MOS memory input are as short as possible. High currents are required because the typical input of the MOS memory device is effectively a capacitor. Thus, in the construction of a memory system, where a number of these capacitive inputs must be tied together, a large node capacitance is presented to the driver circuit.

In a typical circuit of the prior art used as an MOS driver, a saturating transistor is driven from a TTL logic pulse to provide the necessary high current and high voltage pulse through a current amplifier to the MOS memory input. When the saturating transistor is turned on with sufficient base drive to maintain saturation, a high transient current associated with the charging or discharging of the load is supplied through the current amplifier and the saturating transistor which is on in a fully saturated condition. This provides a step pulse of high current and voltage with respect to a reference level at the output of the current amplifier. When the saturating transistor is turned off, the required high current is supplied to the current amplifier through a resistor connected to the functional supply ($V_{SS}$) which provides current for the MOS logic circuits inside the integrated circuit.

Since the drive signal input to the MOS unit is a negative pulse with respect to the normal reference level, the saturating transistor and associated circuitry is generally known as the pull-down transistor or circuit. Similarly, the resistor interconnecting the $V_{SS}$ supply to the current amplifier for supplying the high current when the saturating transistor is turned off and the pulse level is returned to the reference level is normally termed the pull-up resistor.

This prior art scheme for providing the required driving signals to the MOS memory device has two basic disadvantages. During the time that the saturating transistor is on, although the pull-up resistor is not performing any desirable function in terms of the output current, the saturating transistor is also sinking current from the $V_{SS}$ supply through the pull-up resistor. Thus, unnecessary power is being dissipated in the pull-up resistor in this scheme. Another disadvantage is that the rise time of the output drive pulse (during pull-up) is always longer than the fall time (during pull-down). This is due to the fact that during pull-down the output current is being supplied through the saturated transistor which presents a very low impedance path, whereas, during pull-up, the output current is being supplied through the pull-up resistor, which presents a much higher impedance path.

Thus, in such prior art drive circuits the long transition time during pull-up, which is particularly aggravated when operating into a plurality of MOS devices (effectively combining capacitors in parallel) severely limits their usefulness.

SUMMARY OF THE INVENTION

The present invention provides an improved driver circuit for MOS (metal oxide semiconductor) memory devices. In the improved drive circuit of this invention, means are provided for achieving a faster rise time during pull-up in the output current supplied to the MOS device. In particular, during the transient time associated with pull-up, constant current switch means are activated to supply constant current to the current amplifier. This significantly decreases the current rise time during pull-up, since in the prior art, the current supplied by the pull-up resistor in the drive circuit decays exponentially as the voltage across it decays. In a constructed embodiment of the invention the rise time during pull-up was approximately one-half that using prior art drivers.

In addition to providing the drive functions in a significantly improved manner over the prior art, additional advantages are obtained as will be set forth in more detail hereinafter. For present purposes, it may be briefly pointed out that the drive circuit of this invention does not require power from the already usually heavily loaded $V_{SS}$ supply, but instead can operate from the $V_{BB}$ supply normally only used for very small current (approximately 100 microamperes) for substrate bias MOS memory. Additionally, clamp diode means are provided to establish the drive pulse output voltage at a level slightly higher than the $V_{SS}$ level supplied by prior art drivers thereby increasing driver-MOS function reliability.

DETAILED DESCRIPTION

Figure 1:
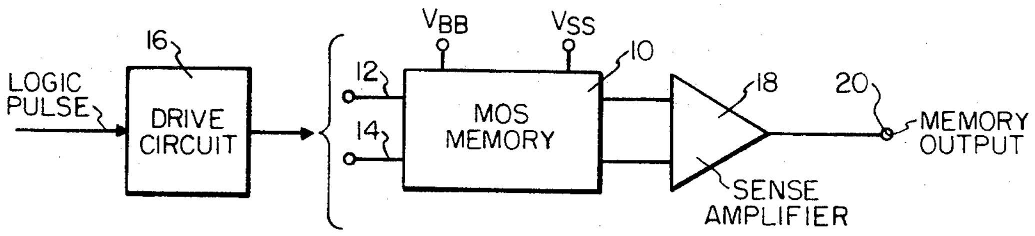
FIG. 1 illustrates in block diagram form the typical use of drive circuits as an interface between logic pulse signals and the input of an MOS memory device.

Referring now to FIG. 1, there is illustrated an MOS memory device 10 having the usual address input line 12 and clock input line 14 for receiving logic pulse inputs through an interface drive circuit 16. The typical MOS memory 10 as shown in FIG. 1, requires two separate voltage power supplies. The supply designated $V_{BB}$ is approximately +20 volts, and $V_{SS}$ is approximately +16 volts. $V_{BB}$ is used for substrate bias in the memory and draws a very small current, approximately 100 microamps. $V_{SS}$ is the functional supply and provides current for the MOS logic circuit inside the integrated circuit. A sense amplifier 18 is coupled to the output of the MOS memory device for amplifying the corresponding signal representing the condition of the memory to an output memory terminal 20.

Figure 2A:
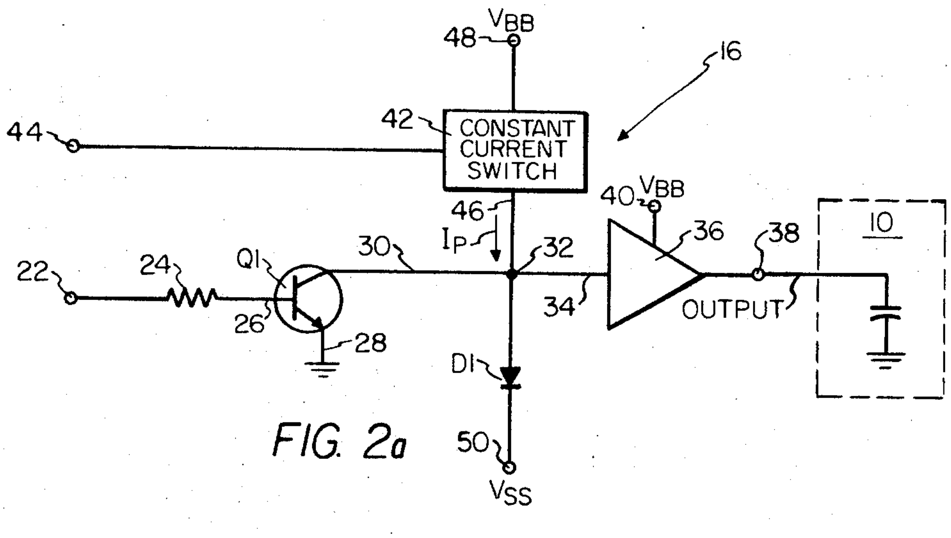
FIG. 2*a* illustrates a drive circuit in accordance with the principles of the present invention.
Figure 2B:
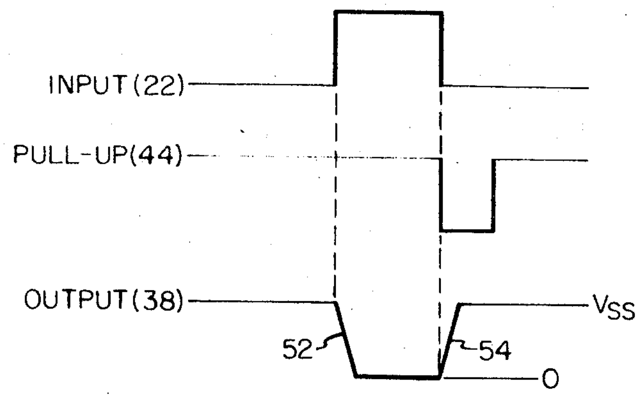
FIG. 2*b* is a schematic time diagram illustrating various wave forms in connection with the drive circuit of FIG. 2*a*.

In FIG. 2*a* there is illustrated an improved drive circuit 16 in accordance with the principles of the present invention. Reference may also be had to FIG. 2(b)

which illustrates the various waveforms and the timing thereof in connection with this circuit. The improved drive circuit 16 includes an input terminal 22 connected through a resistor 24 to an input base lead 26 of a saturating transistor $Q_1$. As shown in FIG. 2a the emitter of transistor $Q_1$ is directly connected to ground at ground point 28, whereas the collector is connected through lead 30 to a junction point 32.

The output of saturating transistor $Q_1$ is coupled through junction 32 and lead 34 to a current amplifier 36 having an output terminal 38 for coupling to the MOS memory device 10. Thus, the output terminal 38 can be suitably connected to the input lines 12 or 14 of the MOS memory 10. The capacitance, $C_T$, represents the equivalent capacitance at the input of the MOS memory device. The current amplifier 36 is operated from the $V_{BB}$ supply of the MOS memory device through terminal 40.

A constant current switch 42 having an input terminal 44 has an output lead 46 also connected to junction point 32. The constant current switch is supplied through terminal 48 by the standard $V_{BB}$ supply of the MOS memory device.

The junction point 32 is connected to the $V_{SS}$ supply of the MOS device through terminal 50 and interconnecting clamp diode $D_1$.

For purposes of illustrating the operation of the improved driver circuit 16 according to the principles of the present invention, reference may be made to FIGS. 2a and b. As in standard prior art driver circuits, when it is desired to drive the MOS memory (i.e., pull down the output at terminal 38) the saturating transistor $Q_1$ is driven from a TTL logic pulse which may emanate from the control section of the MOS memory. The transistor $Q_1$ is turned on with sufficient base drive to maintain saturation so as to sink the transient current out of the current amplifier 36. Thus, initially, the voltage at output terminal 38 drops from a level of $V_{SS}$ to zero as shown by the leading edge 52 of the output pulse which occurs during the transient. After the transient all currents fall to zero. This zero current condition in $Q_1$ allows the output voltage to fall all the way to ground since the $Q_1$ saturation voltage becomes very small with zero collector current.

When it is desired to pull up the output, $Q_1$ is turned off by terminating the TTL logic pulse at terminal 22, and the constant current switch 42 is turned on by supplying a pull-up pulse at input terminal 44. The pull-up pulse may also be supplied from TTL logic and emanate from the MOS memory control section.

Thus, during the transition of the output voltage at terminal 38 from the zero level to $V_{SS}$, represented by the trailing edge 54 in FIG. 2b, a constant current is being supplied through power supply $V_{BB}$ through the constant current switch 42, junction 32, current amplifier 36 and output terminal 38 to the MOS load. A fast rise time (trailing edge 54) is achieved during pull-up because the current supplied to amplifier 36 remains constant during the transient. It will be recalled that in prior art driver circuits, the current supplied through the pull-up resistor decays as the voltage across it decays, thus providing an undesirably long rise time during the pull-up transition.

Also, it is to be noted that since the current switch 42 in FIG. 2a is normally off until turn-on by the pull-up pulse, no unnecessary power is dissipated in this driver circuit. After pull-up the clamp diode $D_1$ establishes the output voltage slightly higher than $V_{SS}$ by the voltage drop across $D_1$ so as to insure the required $V_{SS}$ level input to the MOS device.

Thus, in summary, the following advantages are afforded in this invention as compared to the prior art:

1. Faster rise time is achieved during pull-up;
2. No unnecessary power is disspated;
3. After pull-up, the clamp diode $D_1$ establishes the high level output voltage at $V_{SS}$; and
4. Power drawn by both the current switch 42 and the amplifier 36 is taken from the $V_{BB}$ supply, thereby reducing the load of the $V_{SS}$ supply. $V_{SS}$ is now used for only the MOS memory logic circuits.

Figure 3:
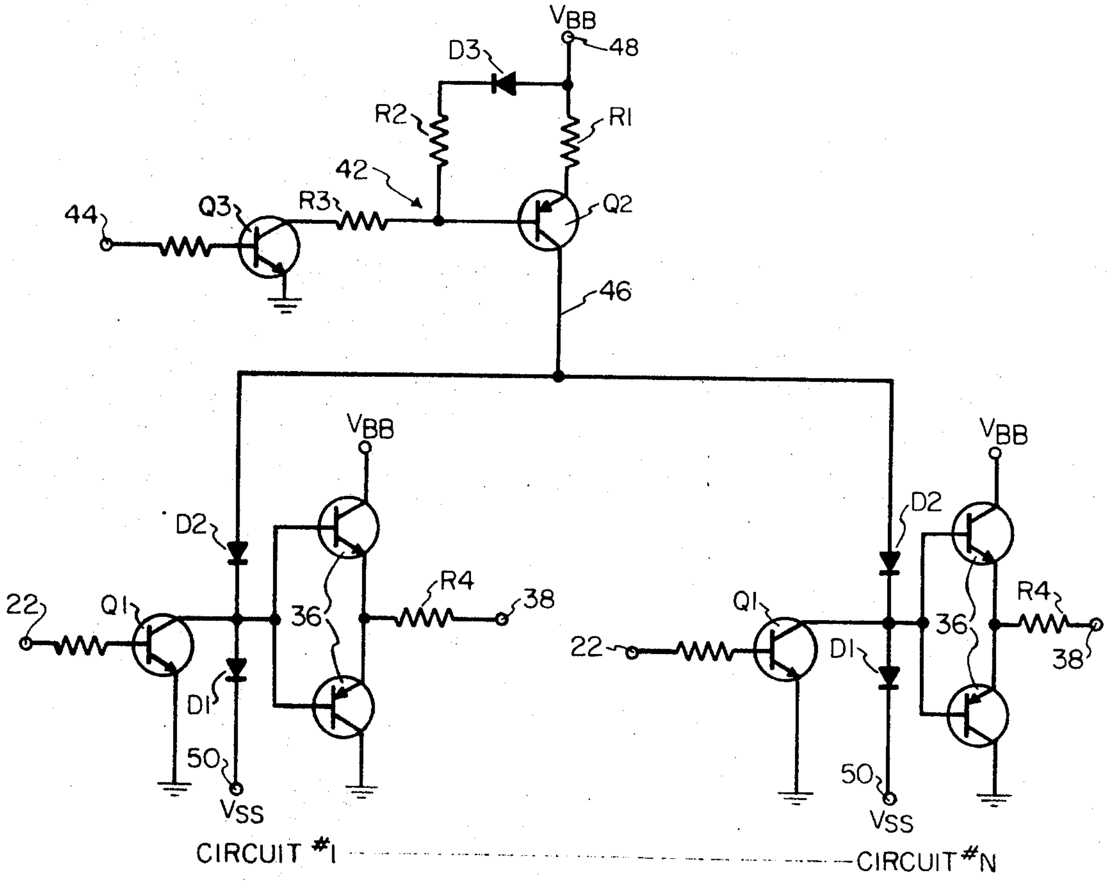
FIG. 3 is a schematic diagram illustrating one embodiment of a drive circuit constructed in accordance with the principles of the invention shown in FIG. 2*a*.

Referring now to FIG. 3, the schematic circuit diagram illustrates in detail an actual circuit embodiment used to realize the principles of the invention. It is to be realized of course that the constant current switch and the current amplifier circuits shown in FIG. 3 represent only one of many possible ways in which the associated functions may be accomplished, and their illustration herein is only for the purpose of setting forth a practical example of the principles of the invention.

In FIG. 3 there is illustrated groups of pull-down saturating transistors $Q_1$ and current amplifiers 36, with each group being associated with a common pull-up constant current switch circuit 42. Between the output of the common constant current switch 42 and the individual pull-down circuits No. 1 through No. N, there has been added respective diodes $D_2$ to provide blocking isolation and thereby prevent erroneous switching between the individual pull-down circuits.

Sharing of the pull-up constant current switch circuit 42 among a group of pull-down dircuits and amplifiers is made possible due to the way the MOS memory integrated circuit is used in the memory system. When driving the clock inputs on line 14 (see FIG. 1) of a number of memory integrated circuits, only one integrated circuit will be selected or operated at a time. If each pull-down circuit is connected to the identical clock input of a different integrated circuit, then only one pull-down circuit will be operated at any particular time. Similarly, during pull-up, the current source is supplying current to only one amplifier 36 as its load. Thus, when driving the clock inputs of a number of MOS memory integrated circuits, there is no rise time degradation since no actual current sharing or splitting occurs.

It is also desired to use this circuit for address input driving. In a memory system all corresponding address inputs of all MOS integrated circuits are tied together. The result is actual sharing of pull-up current among all pull-down and amplifier circuits which happen to be down for a particular address. The worse case situation is when all address inputs are pulled down, thereby sharing the pull-up current among all circuits in the group. This condition can be tolerated in the memory system within reasonable limits if sufficient time is allowed in the memory cycle to pull up all circuits within the group before a new cycle must be initiated. It should be noted that this degraded rise time is not part of the memory access time since all address inputs are unconditionally pulled up at the end of a cycle. At the beginning of the next memory cycle, only those inputs will be pulled down which correspond to the particular address. The time required to establish the proper address at the MOS integrated circuit inputs, there-fore, is not a function of address since the pull-down function is done on an individual circuit basis.

In the schematic diagram of FIG. 3, the current amplifiers 36 in each of the pull-down circuits 1 through N comprises a complementary emitter-follower type. The high load currents presented to the respective output terminals 38 are carried by the transistors of each amplifier. The resistors R4 are present to damp out ringing in the output.

In the common pull-up constant current switch circuit 42, the "on" current level is established by the resistor $R_1$ and the voltage divider consisting of $R_2$ and $R_3$. Diode $D_3$ provides temperature compensation in the form of increasing base voltage of transistor $Q_2$ with increasing temperature. The current switch 42 is on when transistor $Q_3$ is pulsed on by a suitable pull-up pulse supplied to terminal 44 — and "off" when transistor $Q_3$ is in the off condition. The emitter voltage of transistor $Q_2$ is chosen such that $Q_2$ will remain out of saturation when its collector reaches the clamp voltage $V_{SS}$. This condition allows rapid turn-off of transistor $Q_2$ in preparation of the beginning of the next memory cycle.

The foregoing detailed description has been given for clearness of understanding only, and no unnecessary limitations should be understood therefrom, as modifications will be obvious to those skilled in the art.

What is claimed is:

1. A driver circuit for MOS memory logic circuits comprising:

a current amplifier having an output connectable to the input of said MOS memory logic circuit for providing a stepped drive signal including leading and trailing edge pulse steps oppositely directed from a reference level for driving said MOS circuit;

a transistor input stage for driving said current amplifier, said transistor input stage drivable from an off condition to a saturation condition to provide said leading edge pulse step in one direction from said reference level, and said transistor input stage drivable from saturation to said off condition to provide said trailing edge pulse step in a direction towards said reference level; and switch means comprising a non-saturated transistor (Q2) coupled to said current amplifier and a switching transistor coupled to said transistor (Q2), said switching transistor normally in an off condition and switchable to an on condition for enabling said transistor (Q2) to supply a constant current to said current amplifier when said transistor input stage is driven from saturation to said off condition, so as to lessen the time duration of said trailing edge pulse step.

2. A driver circuit for MOS memory logic circuits as claimed in claim 1, said switching transistor having a collector element coupled to the base element of said transistor ($Q_2$).

3. A driver circuit for MOS memory logic circuits as claimed in claim 1, including diode means coupled to the input of said MOS memory logic circuit for selectively clamping said input to said reference level during intervals when said MOS circuit is not being driven.

4. A driver circuit for MOS memory logic circuits as claimed in claim 1, wherein said current amplifier comprises a complementary transistor pair, the emitters of each transistor of said complementary transistor pair being interconnected and comprising the output of said current amplifier, and the bases of each transistor of said complementary transistor pair being interconnected at the input of said current amplifier.

5. A driver circuit for supplying pull-down and pull-up pulses in opposite directions from a reference level for driving MOS memory logic circuits, said driver circuit comprising:

a plurality of pull-down circuits coupled to said MOS circuits for providing said pull-down pulses in response to logic pulses when driving said MOS circuits;

a constant current pull-up circuit for operatively supplying a constant current to said MOS circuits;

coupling means interconnecting said constant current pull-up circuit with each of said plurality of pull-down circuits but substantially preventing intercoupling of said pull-down pulses between said pull-down circuits; and selective switching means for selectively operating said constant current pull-up circuit following said pull-down pulse to provide said pull-up pulse with constant current to said MOS circuits.

6. A driver circuit as claimed in claim 5, wherein said coupling means comprises a plurality of diodes each interconnecting said constant current pull-up circuit with a respective one of said pull-down circuits.

7. In MOS memory logic circuits having a $V_{BB}$ power supply for substrate bias, and current amplifier means for supplying pull-down and pull-up pulses for respectively driving the input of said MOS circuits down from a quiescent reference level and up to said reference level, the improvement comprising:

constant current switch means operable to supply a constant current to the input of said MOS circuits during pull-up of said MOS input to said reference level.

8. The improvement of claim 7, further including means coupling said current amplifier and said constant current switch means to said $V_{BB}$ power supply so that power drawn by said amplifier and said switch means is drawn from said $V_{BB}$ power supply.

* * * * *